(12) United States Patent
Hwang

(10) Patent No.: US 11,788,695 B1
(45) Date of Patent: Oct. 17, 2023

(54) MULTIDIRECTIONALLY ADJUSTABLE OUTDOOR SOLAR LAMP

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 18/097,763

(22) Filed: Jan. 17, 2023

(51) Int. Cl.
| | |
|---|---|
| *F21S 9/03* | (2006.01) |
| *F21V 21/08* | (2006.01) |
| *F21V 19/02* | (2006.01) |
| *F21V 21/29* | (2006.01) |
| *F21L 4/04* | (2006.01) |
| *F21V 21/28* | (2006.01) |
| *F21V 21/26* | (2006.01) |
| *F21V 21/30* | (2006.01) |

(52) U.S. Cl.
CPC ............. *F21S 9/037* (2013.01); *F21V 19/02* (2013.01); *F21V 21/0824* (2013.01); *F21L 4/04* (2013.01); *F21L 4/045* (2013.01); *F21S 9/03* (2013.01); *F21S 9/032* (2013.01); *F21S 9/035* (2013.01); *F21V 21/26* (2013.01); *F21V 21/28* (2013.01); *F21V 21/29* (2013.01); *F21V 21/30* (2013.01)

(58) Field of Classification Search
CPC .... F21S 9/03; F21S 9/032; F21S 9/035; F21S 9/037; F21V 21/0824; F21V 21/26; F21V 21/28; F21V 21/29; F21V 21/30; F21L 4/04; F21L 4/045
See application file for complete search history.

(56) References Cited

U.S. PATENT DOCUMENTS

| | | | |
|---|---|---|---|
| 10,393,326 B2 | 8/2019 | Inskeep | |
| 10,948,166 B2 * | 3/2021 | Ohara | F21V 21/0965 |
| 2007/0014115 A1 * | 1/2007 | Katz | F21V 21/30 |
| | | | 362/382 |
| 2018/0340661 A1 * | 11/2018 | Inskeep | F21V 19/02 |
| 2020/0072450 A1 * | 3/2020 | Mullen | F21V 21/28 |

* cited by examiner

*Primary Examiner* — Colin J Cattanach
(74) *Attorney, Agent, or Firm* — BACON & THOMAS, PLLC

(57) ABSTRACT

A multidirectionally adjustable outdoor solar lamp includes a main light installed with a battery, and a multiple of auxiliary lights pivotally connected to the outer periphery of the top of the main light by a pivot assembly, and each auxiliary light has a solar panel and can be rotated using the corresponding pivot assembly as an axis, or deflected upwards or downwards relative to the main light, in order to improve the charging efficiency and achieve a multi-angle lighting effect.

5 Claims, 9 Drawing Sheets

MULTIDIRECTIONALLY ADJUSTABLE OUTDOOR SOLAR LAMP

TECHNICAL FIELD OF THE DISCLOSURE

The present disclosure relates to a multidirectionally adjustable outdoor solar lamp which includes a main light and a plurality of auxiliary lights pivoted to the outer periphery of the top of the main light and having a solar panel, such that the angle of the solar panel can be adjusted to improve the charging efficiency, and both the main light and the plurality of auxiliary lights have a multi-angle lighting function and can be used as a flashlight, a camping lamp, a garden lamp or a backup power.

DESCRIPTION OF RELATED ART

Outdoor activities such as camping and mountain climbing can let us deeply know about natural ecology and relax our body and mind, and thus are popular leisure options. Camping lamps and flashlights are necessary items for camping, in which the camping lamp has a relatively short distance but a relatively larger range of lighting, and the flashlight has the effect of concentrating light with a longer distance and a smaller range of lighting.

In general, the number of camping lamps is adjusted according to the number of people and the number of tents, and a camping lamp is usually placed in the tent, and another camping lamp is placed outside the tent. If the number of people increases, the number of tents used will increase, and the places that need the camping lamps will increase accordingly. For example, kitchen tents and living room tents belonging to public areas need to use more camping lamps for lighting, but carrying a number of camping lamps will increase the weight and volume of luggage. Obviously, the related art requires improvements.

The related art, U.S. Pat. No. 10,393,326B2 entitled "Expanding multi-faced work light flashlight" is a kind of flashlight that expands the lighting range and can be used as a camping lamp. In its structure, a battery is installed in a handle of the flashlight, and a light head is pivotally connected to a front end of the handle to provide the flashlight function and surrounded by a plurality of light panels which can be folded and stacked against the periphery of the handle. During operation, users can expand the plurality of light panels relative to the lamp head in an umbrella-like form to increase the lighting range.

However, the known art U.S. Pat. No. 10,393,326B2 adopts a rechargeable battery, which has a limited battery life. If the battery is used for a long time, the power will be exhausted, thus giving rise to the need to carry a spare battery for replacement, and resulting in an increase of the luggage burden. Although the known art U.S. Pat. No. 10,393,326B2 has considered the convenience of accessing power by replacing the light panel by a solar panel for solar charging, it also sacrifices the function of expanding the lighting, and only maintains the lighting to the level of a flashlight with a small lighting range, so that it is not suitable for use as a camping lamp.

In view of the aforementioned drawbacks of the related art, the present discloser based on years of experience in the related industry to conduct research and experiment, and finally provided a multidirectionally adjustable outdoor solar lamp suitable for large-range and long-distance lighting, and provides various functions of a camping lamp, a flashlight, a garden lamp and a solar charging backup power to improve the use of lamps in lighting and power storage.

SUMMARY OF THE DISCLOSURE

Specifically, this disclosure is directed to a multidirectionally adjustable outdoor solar lamp, including:

a main light, the main light having a columnar casing with two ends, namely a top and a bottom, and the casing having a battery installed therein, and a control switch and a power input/output interface installed outside the casing and respectively and electrically coupled to the battery, and the power input/output interface providing an external power supply to the battery for charging or outputting and supplying electrical power to an external electronic device;

wherein, the casing comprises a light emitting unit installed to the top of the casing and electrically connected to the battery and the control switch, a plurality of equidistant pivot slots formed on the outer periphery of the top of the casing and arranged into a round shape, and a support rod deflectably and pivotally coupled to the bottom of the casing;

a plurality of auxiliary lights installed to the outer periphery of the top of the main light casing, and each auxiliary light being in a substantially flat shape and having a first functional surface provided with a solar panel, a second functional surface opposite to the first functional surface and having a light panel, and an end proximate to the main light, and the first and second functional surfaces being respectively and electrically connected to the battery;

a plurality of pivot assemblies installed between an end of each auxiliary light and the main light, a pivot part disposed at each pivot assembly and adjacent to the main light and connected to one of the pivot slots formed on the casing of the main light, such that each auxiliary light can be upwardly deflected and expanded relative to the main light through the pivot part or downwardly deflected, folded and stacked onto the periphery of the casing of the main light; and a rotating part, installed to each pivot assembly and adjacent to the auxiliary light, and axially coupled to an end of the corresponding auxiliary light, such that each auxiliary light can be rotated relative to the main light by using the rotating part as an axis to allow the first functional surface to rotate upwardly to receive and convert solar radiation into electrical energy for charging the battery, or allow the second functional surface to rotate upwardly, outwardly or downwardly for lighting.

Compared to the prior art, the defection angle of the main light and the plurality of auxiliary lights of this disclosure not only can be adjusted relative to the support rod, but also can be used for providing a multi-directional rotation relative to the corresponding pivot assembly to adjust the deflection angle in order to be deflected upward and expanded or deflected downward and folded or rotated relative to the main light to improve the charging efficiency of the main light and the plurality of auxiliary lights and achieve a multi-angle lighting effect, so as to improve the use of lamps in lighting and power storage of the known technologies.

The technical characteristics of this disclosure will become apparent with the detailed description of preferred embodiments accompanied with the illustration of related drawings.

DETAILED DESCRIPTION OF THE DISCLOSURE

Figure 1:
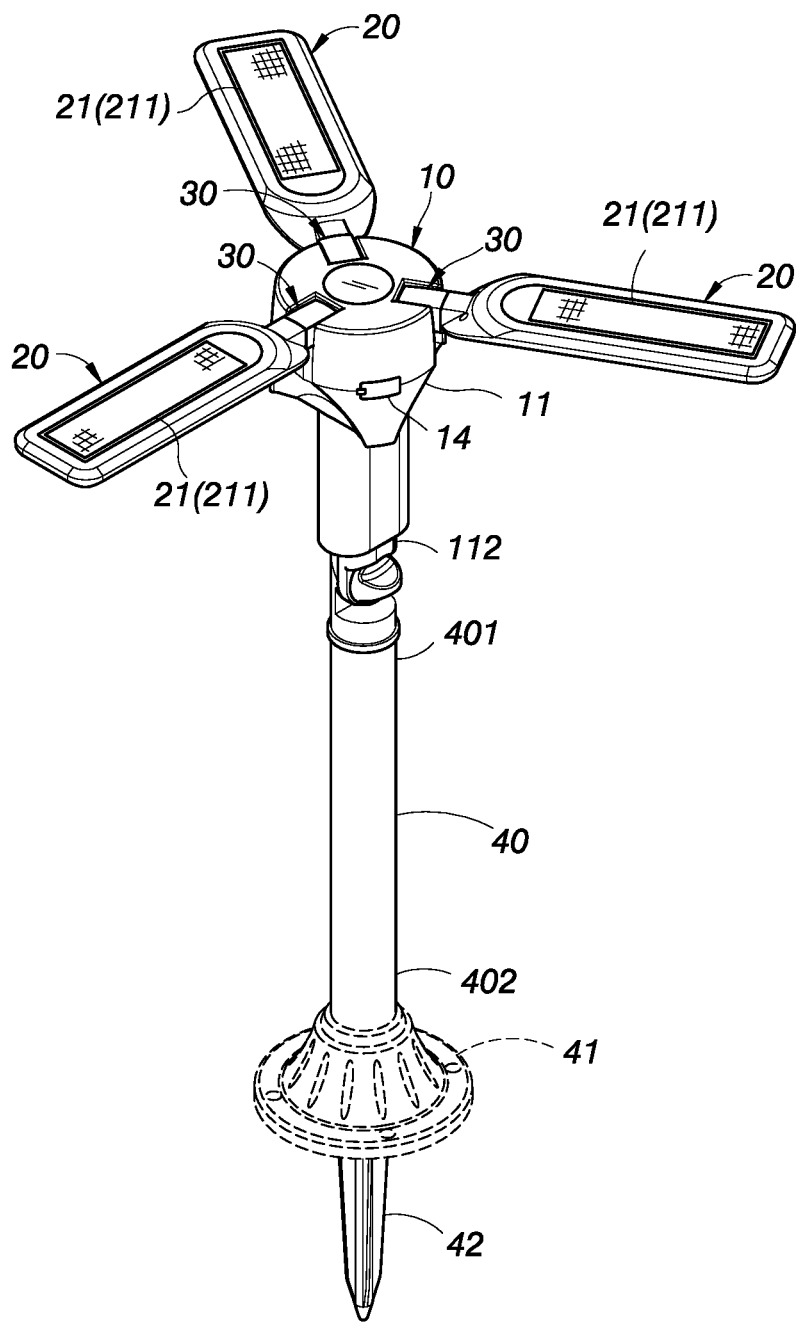
FIG. 1 is a perspective view of this disclosure.

With reference to FIGS. 1 to 4 for a multidirectionally adjustable outdoor solar lamp of this disclosure, the multidirectionally adjustable outdoor solar lamp includes a main light 10, a plurality of auxiliary lights 20 installed at the top periphery of the main light 10, and a plurality of pivot assemblies 30 installed between each auxiliary light 20 and the main light 10.

The main light 10 has a columnar casing 11, and two ends of the casing 11 are a top 111 and a bottom 112 respectively, and a battery 12 is installed in the casing 11, and a control switch 13 and a power input/output interface 14 are installed on the outside of the casing 11 and electrically connected to the battery 12, and the power input/output interface 14 provides an external power supply to be supplied for charging the battery 12, or outputting electrical power to an external electronic device (not shown in the figure) to supply electrical power for the use as an outdoor backup power, and a waterproof cover is mounted onto the power input/output interface 14 to prevent the power input/output interface 14 from being damaged by moisture.

The casing 11 has a light emitting unit 15 installed at the center of the top 111 of the casing 11 and electrically connected to the battery 12 and the control switch 13, and a plurality of pivot slots 16 equidistantly formed around the outer periphery of the top 111 in a round shape, and a support rod 40 pivotally connected to the bottom 112 of the casing 11, such that the main light 10 can adjust the deflection angle relative to the support rod 40.

Each auxiliary light 20 is substantially in a flat shape, and includes a first functional surface 21, a second functional surface 22 opposite to the first functional surface 21, and an end 23 proximate to the main light 10.

The first functional surface 21 is provided with a solar panel 211, and the second functional surface 22 is provided with a light panel 221, and the light panel 221 and the solar panel 211 are respectively and electrically connected to the battery 12 and the control switch 13, such that the control switch 13 can control the light emitting unit 15 of the light panel 221 and the main light 10 to emit light, and the battery 12 can store electrical power and supply the electrical power required for the operation of the auxiliary light 20 and the main light 10.

Each pivot assembly 30 has a pivot part 31 installed at a position adjacent to the main light 10, and a rotating part 32 installed at a position adjacent to the corresponding auxiliary light 20. Wherein, the pivot part 31 is assembled to one of the pivot slots 16 on the casing 11 of the main light 10, such that each auxiliary light 20 can be upwardly deflected and expanded relative to the main light 10 through the pivot part 31 or downwardly deflected, folded and stacked on the periphery of the casing 11 of the main light 10.

The rotating part 32 is axially connected to the end 23 of the corresponding auxiliary light 20, such that each auxiliary light 20 can rotate relative to the main light 10 by using the rotating part 32 as an axis to allow the first functional surface 21 to rotate upwardly to receive and convert solar radiation into electrical energy for charging the battery 12, or allow the second functional surface 22 to rotate upward, outward, or downward for lighting.

With the aforementioned assembly, the main light 10 and the plurality of auxiliary lights 20 of this disclosure not only can adjust the deflection angle relative to the support rod 40, but each auxiliary light 20 can also provide a multidirectional rotation function through the pivot assembly 30 to allow each auxiliary light 20 to be upwardly deflected and expanded or downwardly deflected and folded relative to the main light 10, and to rotate using the corresponding pivot assembly 30 as an axis, so as to adjust the angle of the solar panel 211 and the light panel 221 and achieve the effects of high charging efficiency and multi-angle lighting.

Figure 4:
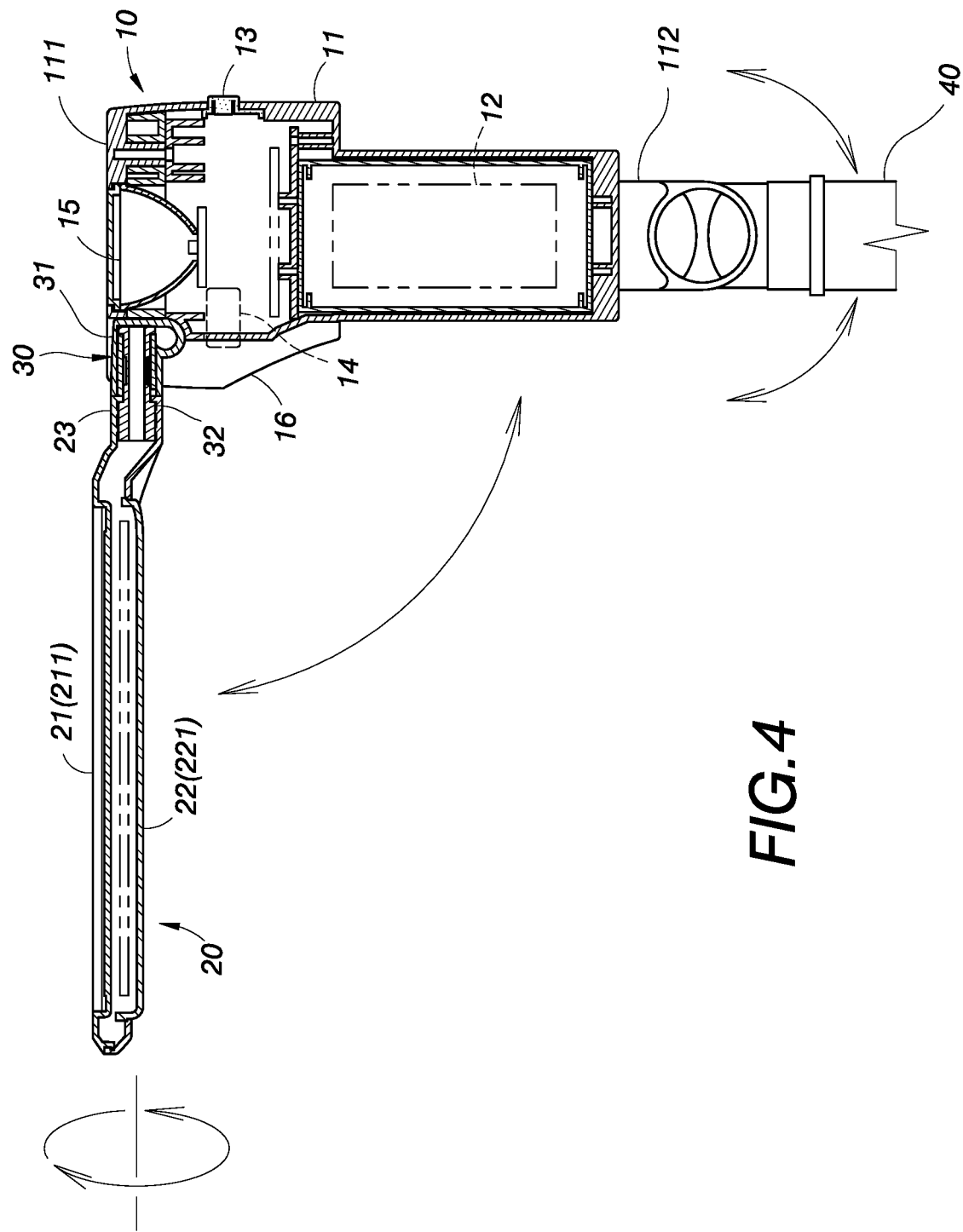
FIG. 4 is a cross-sectional view of this disclosure.
Figure 5:
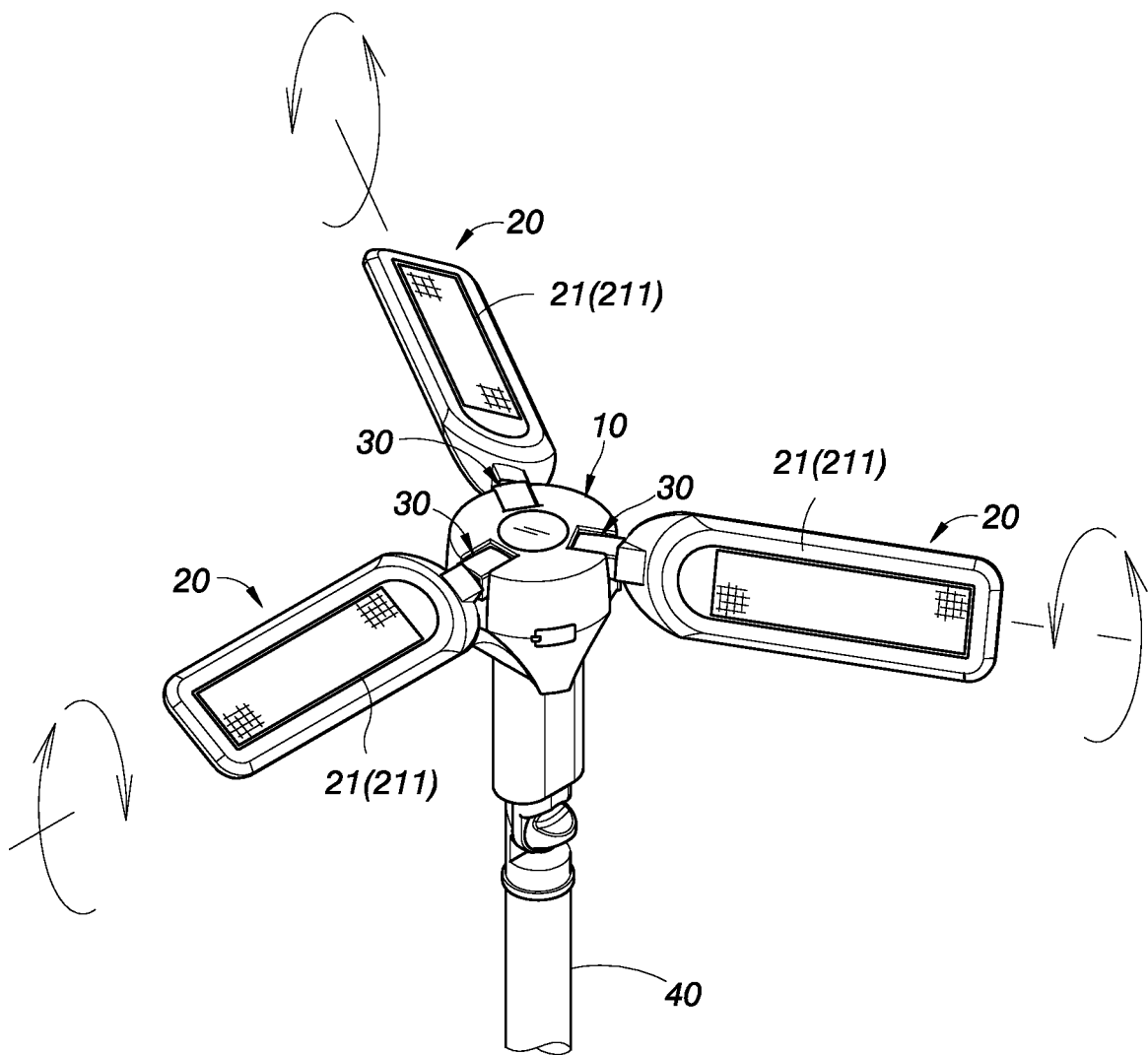
FIG. 5 is a schematic view of a plurality of auxiliary lights rotating by using a pivot assembly as an axis in accordance with this disclosure.

For example, when this disclosure is used as an outdoor garden lamp for a long time, the plurality of auxiliary lights 20 can be deflected upwardly and expanded relative to the main light 10, and each solar panel 211 is rotated upwardly to receive and convert solar radiation into electrical energy for charging the battery 12, and the plurality of light panels 221 can provide lighting downwardly as shown in FIGS. 1 and 4. The users can also adjust the angle of the solar panel 211 that rotates using the corresponding pivot assembly 30 as an axis according to different illumination directions of the sunlight in different seasons, so as to improve the charging efficiency.

Figure 6:
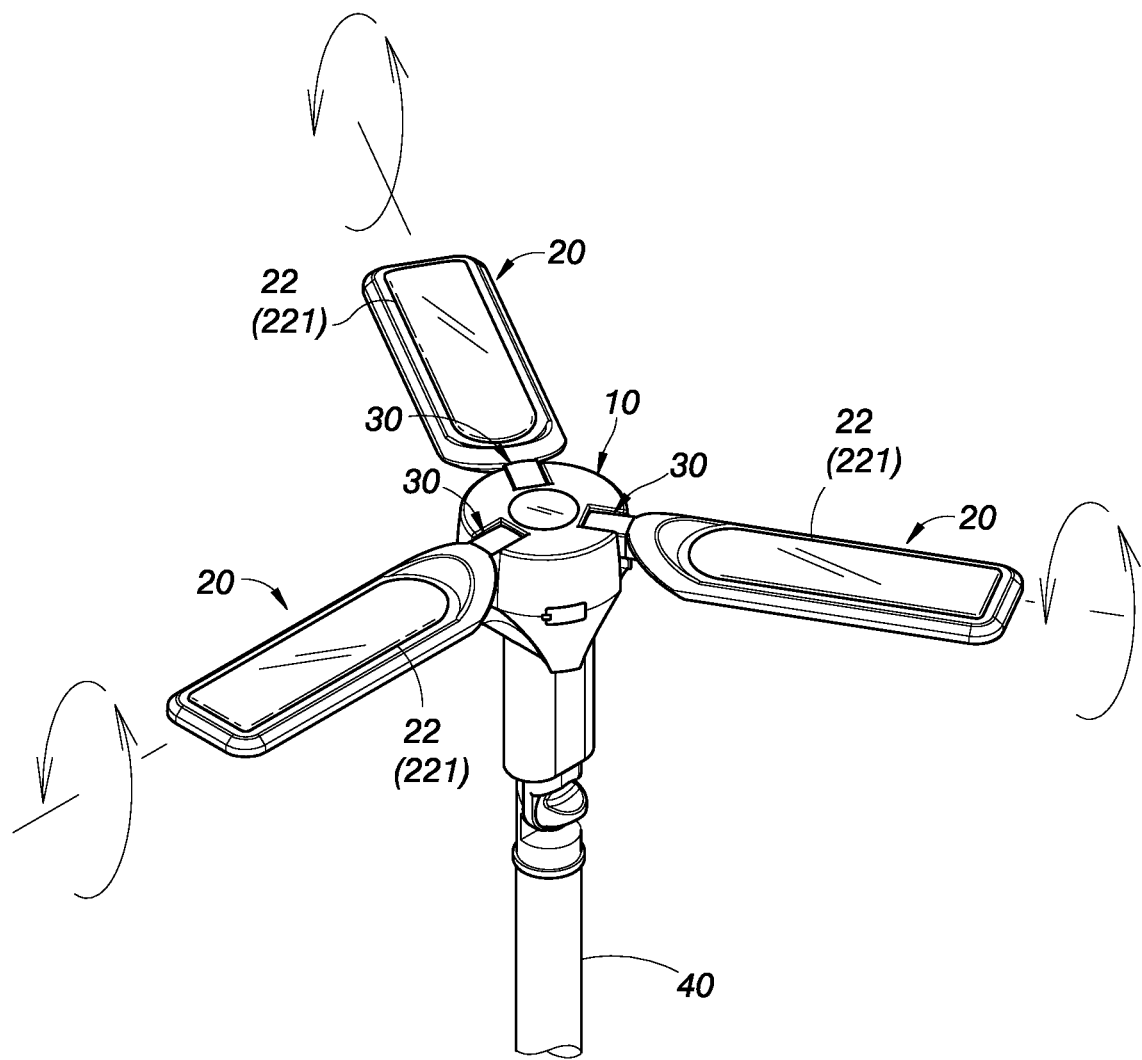
FIG. 6 is a schematic view of rotating a light panel of each auxiliary light upwardly in accordance with this disclosure.
Figure 7:
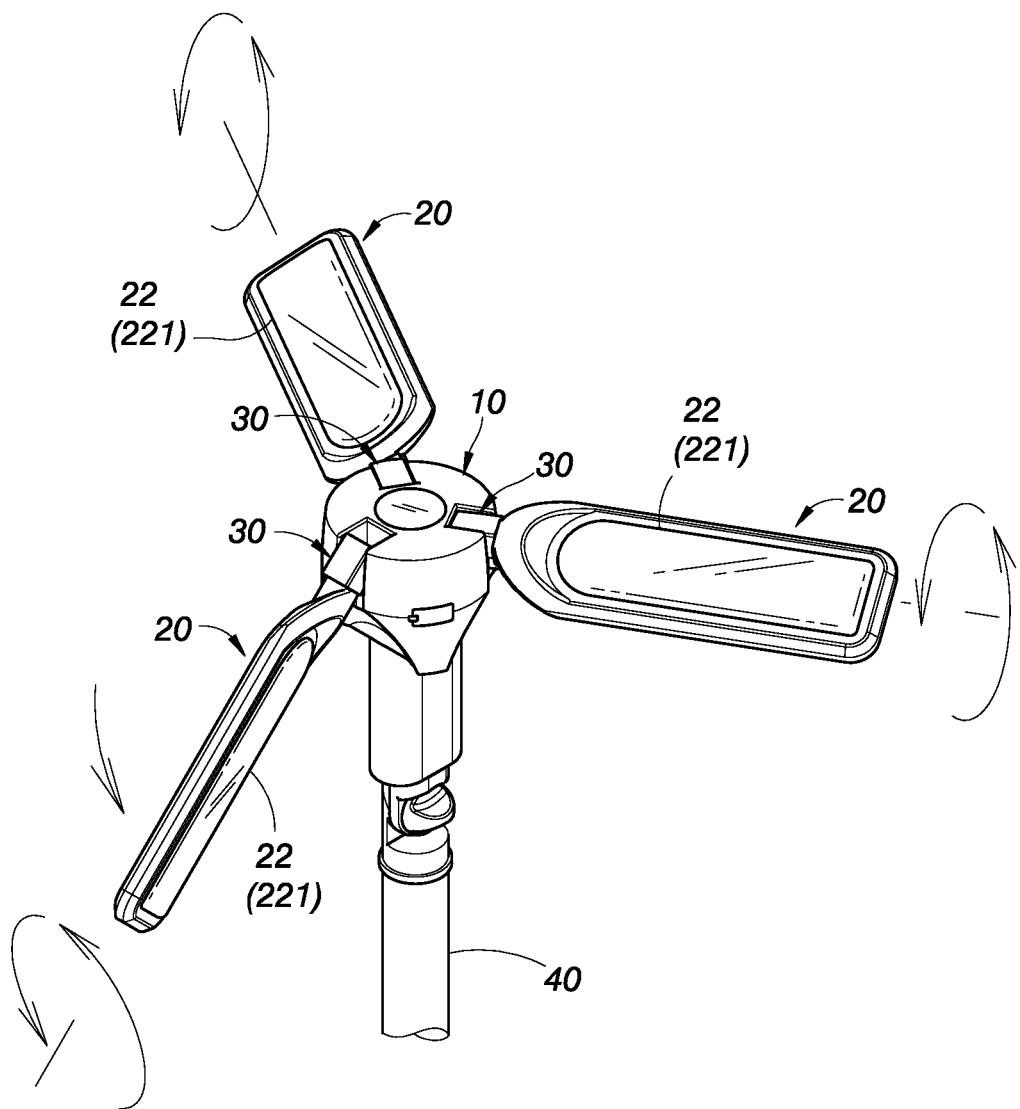
FIG. 7 is a schematic view of rotating and upwardly and downwardly deflecting each auxiliary light relative to the main light in accordance with this disclosure.
Figure 8:
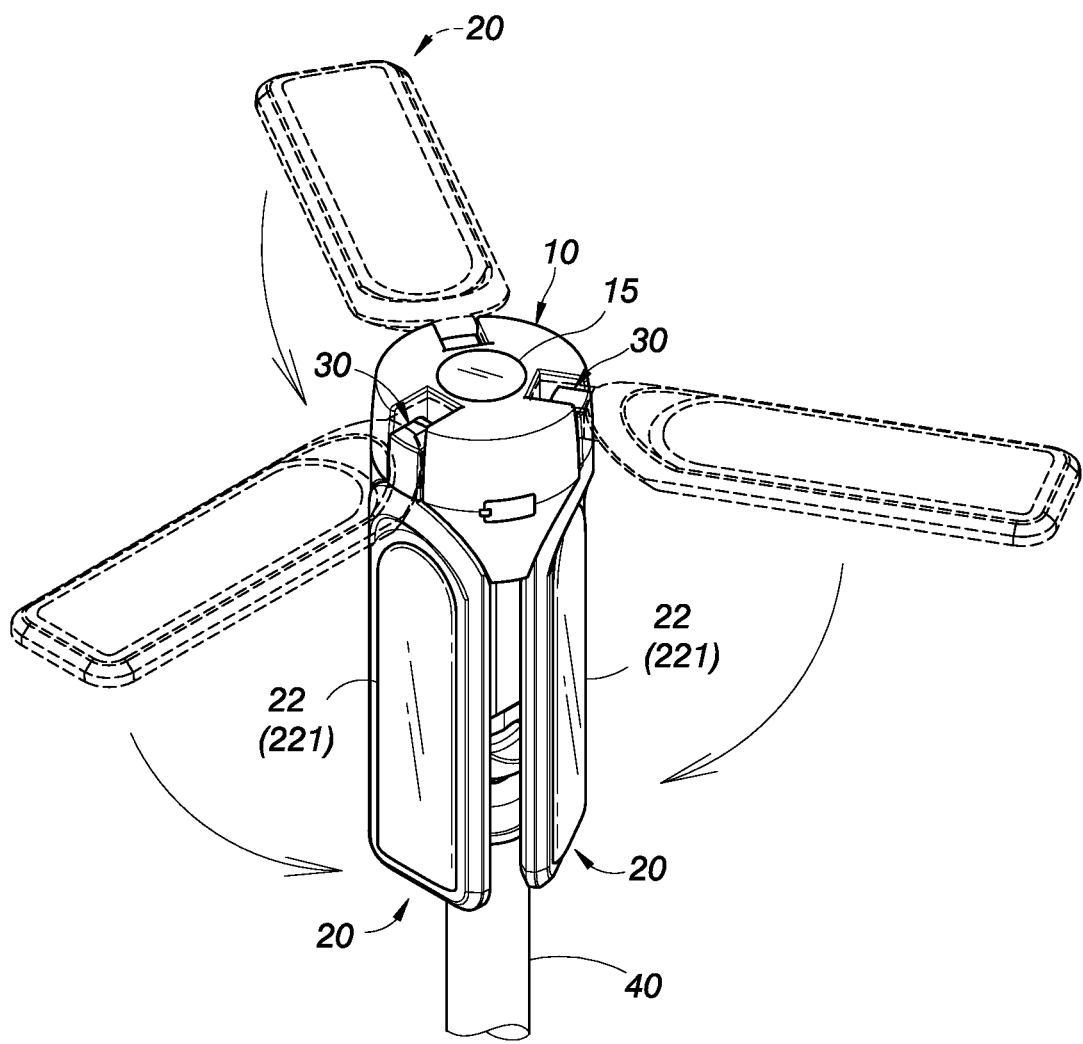
FIG. 8 is a schematic view of downwardly deflecting and folding each auxiliary light relative to the main light in accordance with this disclosure.
Figure 9:
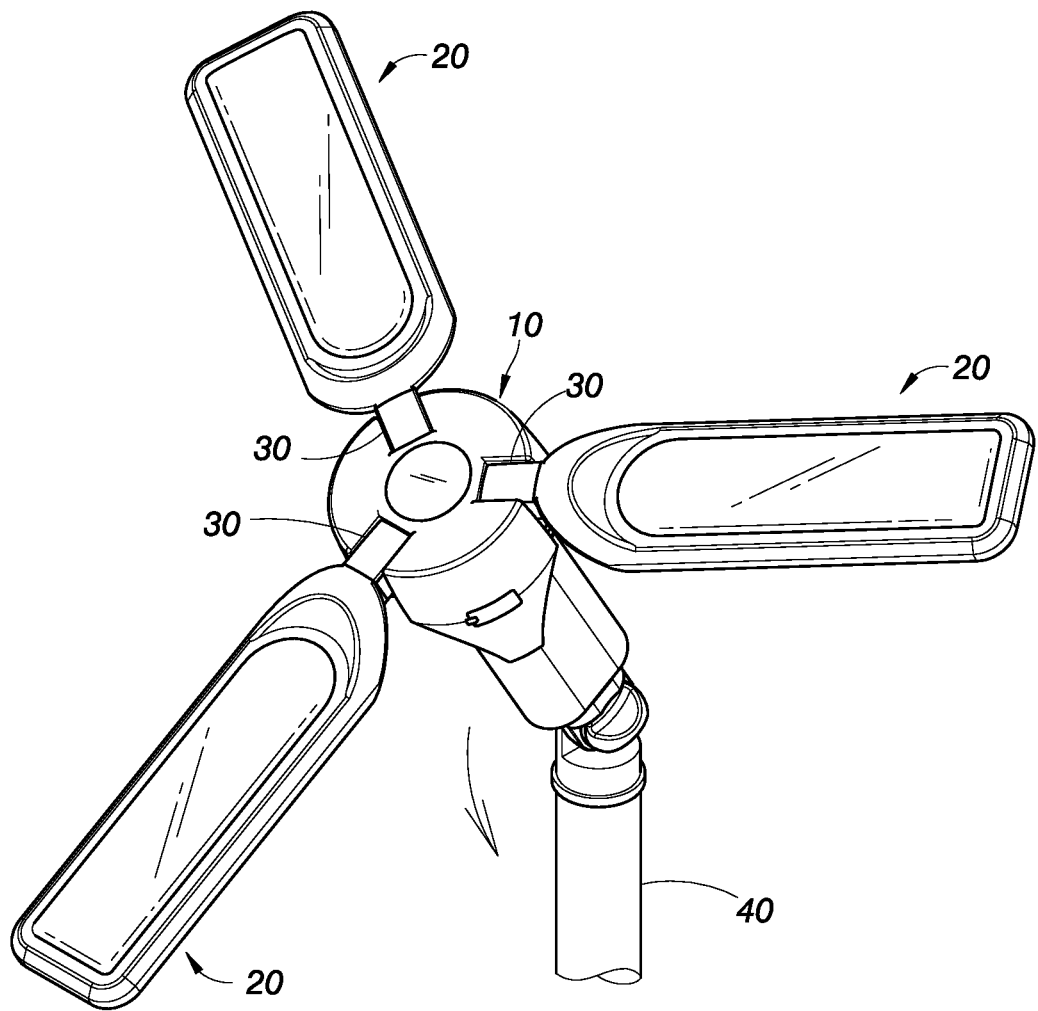
FIG. 9 is a schematic view of adjusting a main light and an auxiliary light to be deflected with an angle relative to a support rod in accordance with this disclosure.

When this disclosure is used in camping activities, the users can rotate and/or upwardly, downwardly or outwardly deflect the light panel 221 of any one of the auxiliary lights 20 for the lighting in different directions, or selectively downwardly defect, fold and stack the plurality of auxiliary lights 20 to the periphery of the main light 10 in order to use the light emitting unit 15 of the main light 10 as a flashlight as shown in FIGS. 6 to 8, or as shown in FIG. 9, adjust the deflection angle of the main light 10 and the plurality of auxiliary lights 20 relative to the support rod 40 to provide different ways of use and improve the use of known technologies in lighting and power storage.

Figure 2:
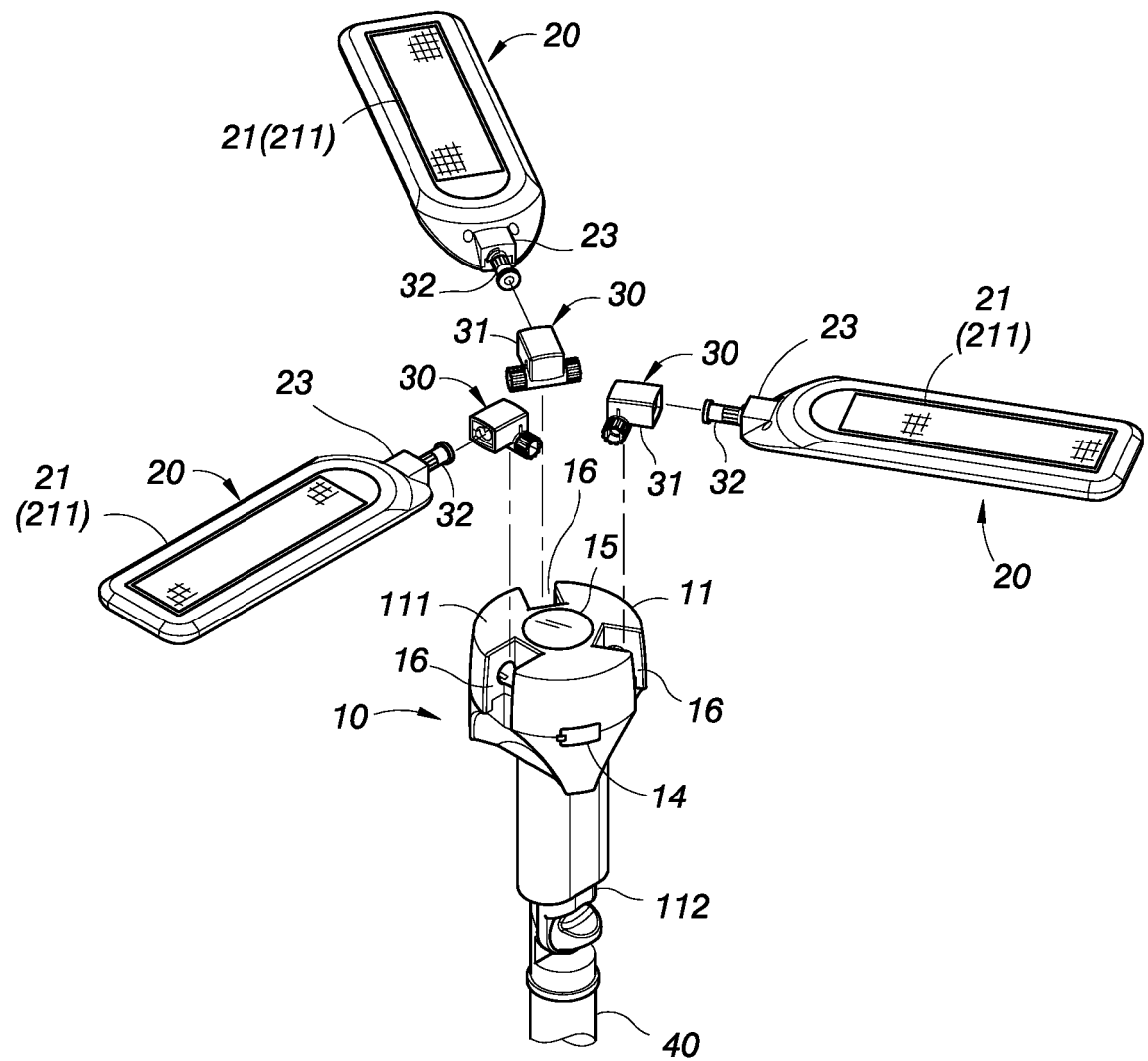
FIG. 2 is an exploded view of this disclosure.
Figure 3:
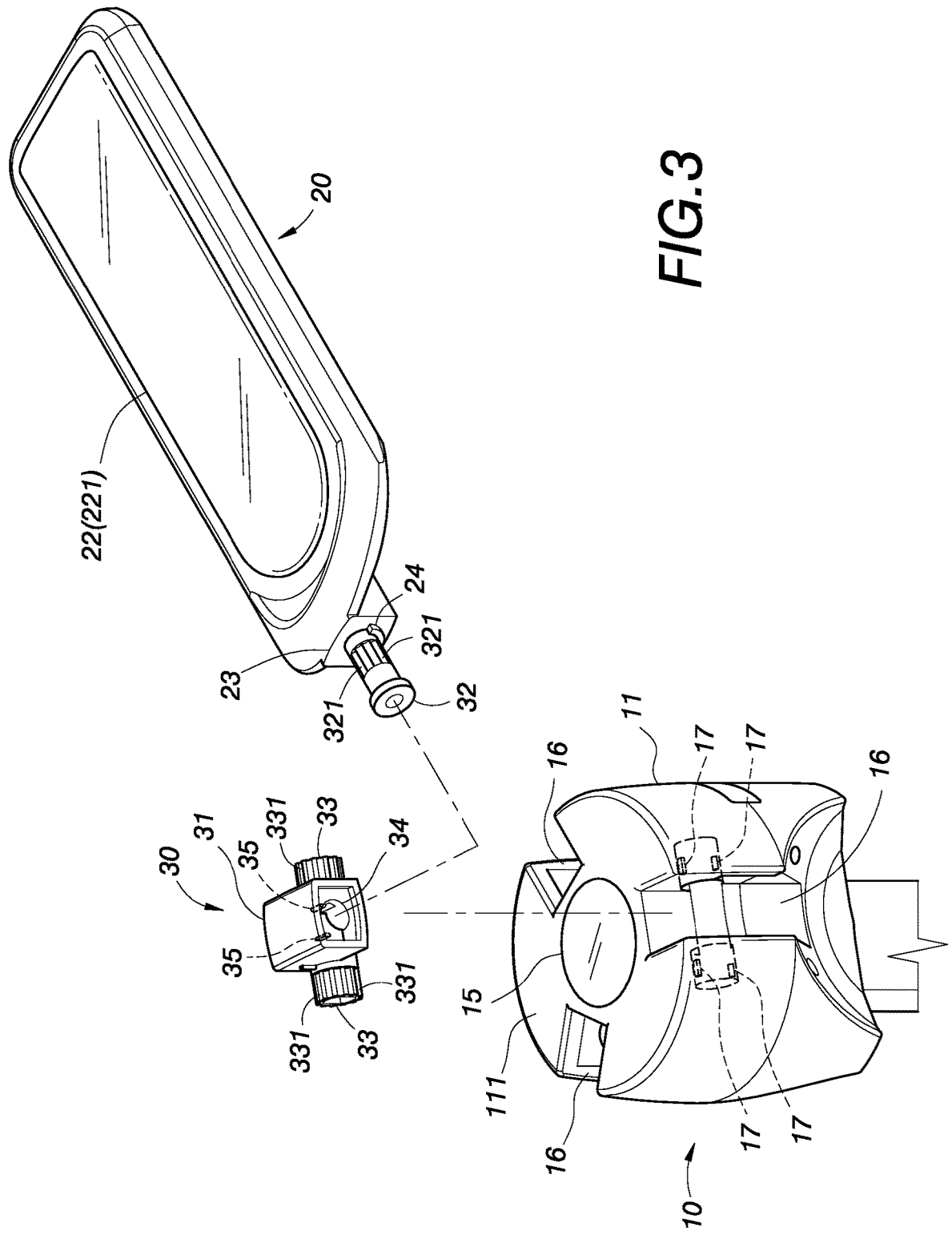
FIG. 3 is a partial exploded view of this disclosure.

The embodiment of the pivot assembly 30 and the support rod 40 is described as follows:

In an embodiment as shown in FIGS. 2 to 4, two sides of the pivot part 31 of the pivot assembly 30 are respectively and pivotally connected to a rotating shaft 33 and the pivot slot 16 formed on the casing 11 of the main light 10, such that the pivot assembly 30 can be upwardly or downwardly deflected relative to the main light 10 by using the rotating shaft 33 as an axis, and the deflection angle of the pivot part 31 does not exceed 90 degrees.

The periphery of the rotating shaft 33 is provided with a plurality of positioning grooves 331 equidistantly arranged into a round shape, and the positioning grooves 331 formed at the inner periphery of the pivot slot 16 opposite to the rotating shaft 33 are provided with at least one elastic bump 17, such that after the pivot part 31 rotates using the rotating shaft 33 as an axis, the elastic bump 17 can be latched into any one positioning groove 331 for positioning to produce an obvious sense of clicking.

In addition, a shaft hole 34 is formed on the pivot part 31, and the rotating part 32 is substantially in a round rod shape having two ends, and one of the ends is axially installed in the shaft hole 34 and the other end is axially connected to the corresponding auxiliary light 20, such that each auxiliary light 20 can rotate relative to the main light 10 by using the rotating part 32 of the corresponding pivot assembly 30 as an axis.

In addition, the periphery of the rotating part 32 is provided with a plurality of equidistant clamping grooves 321 arranged into a round shape, and the plurality of clamping grooves 321 formed at the inner periphery of the shaft hole 34 of the pivot part 31 opposite to the rotating part 32 has at least one elastic clamping block 35, such that after the auxiliary light 20 rotates using the rotating part 32 as an axis, the elastic clamping block 35 can be latched into any one of the clamping grooves 321 for positioning to produce an obvious sense of clicking similarly.

In order to prevent the power cord connected between the battery 12 and auxiliary light 20 from being bent or twisted excessively, a stopper 24 is installed between an end 23 of each auxiliary light 20 and the corresponding pivot assembly 30, and the stopper 24 can limit the rotation angle of the auxiliary light 20 using the rotating part 32 as an axis to an angle not exceeding 360 degrees.

In FIG. 1, the support rod 40 has a top 401 and a bottom 402, and the top 401 of the support rod 40 is pivotally connected to the bottom 112 of the casing 11 of the main light 10, and the bottom 402 of the support rod 40 is removably installed with a positioning seat 41 that can be mounted onto any plane, and a plug-in part 42 that can be plugged into the ground, so that this disclosure can be used as household garden lamp or walkway lamp.

While the disclosure has been described by means of specific embodiments, numerous modifications and variations could be made thereto by those skilled in the art without departing from the scope and spirit of the disclosure as set forth in the claims.

What is claimed is:

1. A multidirectionally adjustable outdoor solar lamp, comprising:
    a main light, having a columnar casing with two ends defined as a top and a bottom respectively, and the casing having a battery installed therein, and a control switch and a power input/output interface installed outside the casing and respectively and electrically coupled to the battery, and the power input/output interface providing an external power supply to the battery for charging or outputting and supplying an electrical power to an external electronic device;
    wherein, the casing comprises a light emitting unit installed to the top thereof and electrically coupled to the battery and the control switch, a plurality of pivot slots formed on the outer periphery of the top of the casing and equidistantly arranged from each other in a round shape, and a support rod deflectably and pivotally coupled to the bottom of the casing;
    a plurality of auxiliary lights installed at the outer periphery of the top of the casing of the main light, and each auxiliary light being in a substantially flat shape and having a first functional surface installed with a solar panel, a second functional surface opposite to the first functional surface and having a light panel, and an end proximate to the main light, and the first and second functional surfaces being separately and electrically coupled to the battery;
    a plurality of pivot assemblies installed between an end of each auxiliary light and the main light, a pivot part disposed at each pivot assembly and adjacent to the main light and coupled to one of the pivot slots of the casing of the main light, such that each auxiliary light can be upwardly deflected and expanded relative to the main light through the pivot part or downwardly deflected, folded and stacked onto the periphery of the casing of the main light; and
    a rotating part, installed to each pivot assembly and adjacent to the auxiliary light, and axially coupled to an end of the corresponding auxiliary light, such that each auxiliary light can be rotated relative to the main light by using the rotating part as an axis to allow the first functional surface to rotate upwardly to receive and convert solar radiation into electrical energy for charging the battery, or allow the second functional surface to rotate upwardly, outwardly or downwardly for lighting;
    wherein the pivot part of the pivot assembly has a rotating shaft and a pivot slot corresponding to the casing of the main light respectively and pivotally coupled to two sides of the pivot part, such that the pivot assembly can be deflected upwardly or downwardly relative to the main light by using the rotating shaft as an axis, and the deflection angle of the pivot part is not more than 90 degrees; and
    wherein the pivot part of the pivot assembly is provided with a shaft hole, and the rotating part is substantially in a round rod shape and has two ends, and one of the ends is axially disposed in the shaft hole and the other end is axially coupled to the corresponding auxiliary light, such that each auxiliary light can rotate relative to the main light by using the rotating part of the corresponding pivot assembly.

2. The multidirectionally adjustable outdoor solar lamp according to claim 1, wherein the rotating shaft comprises a plurality of positioning grooves equidistantly arranged in a round shape at the periphery of the rotating shaft, and the plurality of positioning grooves formed around the inner periphery of the pivot slot and opposite to the rotating shaft comprise at least one elastic bump, such that after the pivot part rotates using the rotating shaft as an axis, the elastic bump can be elastically latched into any one positioning groove and positioned.

3. The multidirectionally adjustable outdoor solar lamp according to claim 1, wherein the rotating part comprises a plurality of clamping grooves formed at the periphery of the rotating part and arranged equidistantly in a round shape, and the plurality of positioning grooves formed around the inner periphery of the pivot slot and opposite to the rotating shaft comprise at least one elastic clamping block, such that after the auxiliary light rotates using the rotating part as an axis, the elastic clamping block can be elastically latched into any one clamping groove and positioned.

4. The multidirectionally adjustable outdoor solar lamp according to claim 1, further comprising a stopper disposed between an end of each auxiliary light and the corresponding pivot assembly, and the stopper can restrict the rotation angle of the auxiliary light that rotates using the rotating part as an axis not exceeding 360 degrees.

5. The multidirectionally adjustable outdoor solar lamp according to claim 1, wherein the support rod has a top and a bottom, and the top of the support rod is assembled to the bottom of the casing of the main light, and the bottom of the support rod is removably provided with a positioning seat that can be fixed to any plane, and a plug-in part that can be plugged into the ground.

\* \* \* \* \*